United States Patent
Ramalingam et al.

(10) Patent No.: US 8,755,208 B1
(45) Date of Patent: Jun. 17, 2014

(54) ADAPTIVE CURRENT LIMIT FOR POWER FACTOR CORRECTION

(71) Applicant: Marvell International Ltd., Hamilton (BM)

(72) Inventors: Sureshkumar Ramalingam, Singapore (SG); Hong Liang Zhang, Singapore (SG)

(73) Assignee: Marvell International Ltd., Hamilton (BM)

(*) Notice: Subject to any disclaimer, the term of this patent is extended or adjusted under 35 U.S.C. 154(b) by 0 days.

(21) Appl. No.: 13/690,581

(22) Filed: Nov. 30, 2012

Related U.S. Application Data

(63) Continuation of application No. 12/754,353, filed on Apr. 5, 2010, now Pat. No. 8,324,870.

(60) Provisional application No. 61/169,922, filed on Apr. 16, 2009.

(51) Int. Cl.
*H02M 1/42* (2007.01)

(52) U.S. Cl.
USPC .................................. 363/89; 323/207

(58) Field of Classification Search
USPC .............. 363/89, 80, 84, 52–54; 323/207, 222
See application file for complete search history.

(56) References Cited

U.S. PATENT DOCUMENTS

| | | | |
|---|---|---|---|
| 6,650,554 B2 | 11/2003 | Darshan | |
| 7,157,886 B2 | 1/2007 | Agarwal et al. | |
| 7,723,964 B2* | 5/2010 | Taguchi | 323/222 |
| 7,733,678 B1* | 6/2010 | Notohamiprodjo et al. | 363/89 |
| 7,936,152 B2* | 5/2011 | Shimizu | 323/222 |
| 8,148,956 B2 | 4/2012 | Hwang et al. | |

* cited by examiner

Primary Examiner — Harry Behm

(57) ABSTRACT

In one embodiment, an apparatus for performing power factor correction is provided. A power factor corrector includes an input configured to sense a current from an input circuit. A reference generator generates a current limit based on an input voltage. The current limit reference is dynamically changed based on the input voltage. A control signal generator controls the current in the input circuit based on a comparison of the current and the generated current limit.

10 Claims, 11 Drawing Sheets

ADAPTIVE CURRENT LIMIT FOR POWER FACTOR CORRECTION

CROSS-REFERENCE TO RELATED APPLICATIONS

The present disclosure is a continuation of U.S. patent application Ser. No. 12/754,353 (now U.S. Pat. No. 8,324,870), filed on Apr. 5, 2010, which claims the benefit of U.S. Provisional Application No. 61/169,922, filed on Apr. 16, 2009. The entire disclosures of the applications referenced above are incorporated herein by reference.

BACKGROUND

The present disclosure generally relates to power factor correction.

Unless otherwise indicated herein, the approaches described in this section are not prior art to the claims in this application and are not admitted to be prior art by inclusion in this section.

Power factor is a ratio of real power flowing to a load to apparent power. Power factor may be described as a number between 0 and 1 or expressed as a percentage. It is desirable to have the power factor be closer to 1 or 100%.

Two factors may affect the power factor. A displacement factor is when a current waveform is not in-phase with a voltage waveform. A distortion factor is when the current waveform is not sinusoidal; that is, distortion may be present in the current waveform. Power factor correction may be used to correct these two factors.

FIG. 1 shows two waveforms illustrating effects of the displacement and distortion factors. A voltage waveform 102 and two current waveforms 104a and 104b are shown. The two current waveforms 104a and 104b illustrate the displacement factor and the distortion factor separately.

Current waveform 104a shows the displacement factor. A phase difference CD exists between voltage waveform 102 and current waveform 104a. Current waveform 104a is thus delayed with respect to voltage waveform 102.

Current waveform 104b shows the distortion factor. Current waveform 104b is in phase with voltage waveform 102; however, current waveform 104b is distorted. For example, total harmonic distortion (THD) is present.

A combination of the displacement factor and distortion factor causes the power factor to be lower. Power factor correction is used to shape the current waveform to make it sinusoidal and in-phase with voltage waveform 102, which raises the power factor.

During power factor correction, it may be desirable to limit the maximum current in an input circuit. If the current is not limited, a system may be damaged. For a given system, input power is given by the root mean square (rms) of the input voltage $V_{in\,rms}$ multiplied by the root mean square of the input current $I_{in\,rms}$. The range of the input voltage $V_{in\,rms}$ is typically 85V-277V. The maximum current occurs at the minimum input voltage $V_{in\,rms}$ of the range for constant input power. FIG. 2 shows a graph 200 of input power vs. input voltage $V_{in\,rms}$ for constant input current. As shown, as the input voltage $V_{in\,rms}$ increases, the input power increases. At a point 202, the input voltage Vin rms is at its lowest and the current is expected to be at its highest. The maximum current limit is thus set at a percentage above the current that occurs at point 202 because this is expected to be the maximum current over the range of voltages for the input voltage $V_{in\,rms}$. The maximum current limit is constant and does not change. Because the limit is constant, this may lead to high input power over the voltage range when the current limit is reached at every switching cycle of a switched mode power supply.

SUMMARY

In one embodiment, an apparatus for performing power factor correction is provided. A power factor corrector includes an input configured to sense a current from an input circuit. A reference generator generates a current limit based on an input voltage. The current limit reference is dynamically changed based on the input voltage. A control signal generator controls the current in the input circuit based on a comparison of the current and the generated current limit.

In one embodiment, an apparatus is provided comprising: an input configured to sense a current and input voltage from an input circuit; a reference generator configured to generate a current limit based on the input voltage, wherein the current limit is adaptively changed over at least a portion of a cycle of the input voltage; and a control signal generator configured to control the current in the input circuit, the control of the current based on a comparison of the sensed current and the generated current limit.

In one embodiment, the current limit is determined from a sinusoidal current limit profile over the at least the portion of the cycle of the input voltage.

In one embodiment, the sinusoidal current limit profile is based on a peak value of the current limit, the peak value of the current limit based on a peak value of the input voltage.

In one embodiment, the control signal generator comprises a comparator configured to compare the current limit and the sensed current. The control signal generator is configured to output a control signal based on the comparison.

In another embodiment, a method is provided comprising: sensing a current and input voltage from an input circuit; generating a current limit based on the input voltage of the input circuit, wherein the current limit is adaptively changed over at least a portion of a cycle of the input voltage; and controlling the current in the input circuit, the control of the current based on a comparison of the sensed current and the generated current limit.

In one embodiment, the current limit is determined from a sinusoidal current limit profile over the at least the portion of the cycle of the input voltage.

In one embodiment, the sinusoidal current limit profile is based on a peak value of the current limit, the peak value of the current limit based on a peak value of the input voltage.

In one embodiment, the method further comprises: receiving the input voltage; determining a peak value of the input voltage and an instantaneous angle of the input voltage; determining a peak value of a sensed voltage, the sensed voltage being a margin above the peak value of the input voltage; generating the current limit by applying the peak value of the sensed voltage to a sine of the instantaneous angle.

The following detailed description and accompanying drawings provide a better understanding of the nature and advantages of the present invention.

DESCRIPTION

Described herein are techniques for current limiting in power factor correction. In the following description, for purposes of explanation, numerous examples and specific details are set forth in order to provide a thorough understanding of embodiments of the present invention. Particular embodiments as defined by the claims may include some or all of the features in these examples alone or in combination with other features described below, and may further include modifications and equivalents of the features and concepts described herein.

Figure 1:
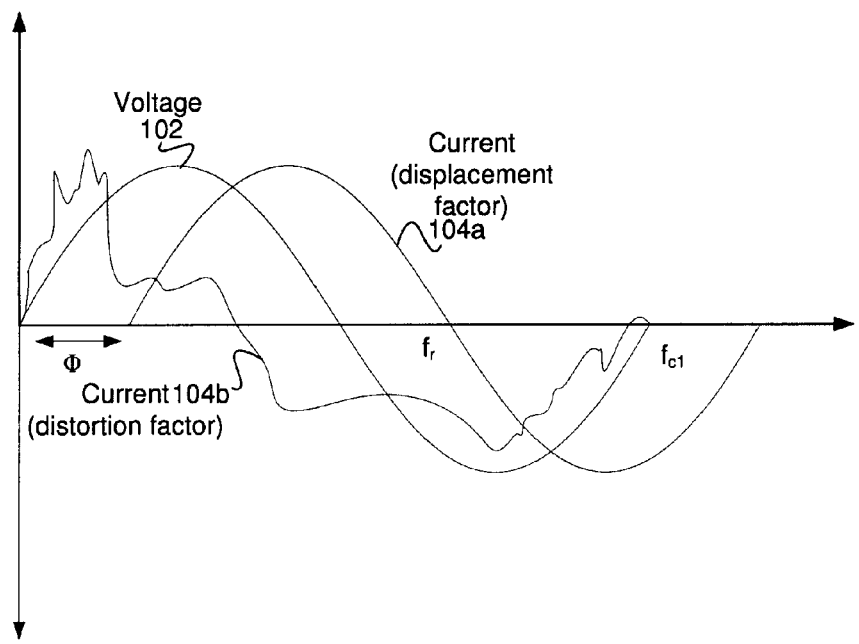
FIG. 1 shows two waveforms illustrating effects of the displacement and distortion factors.
Figure 2:
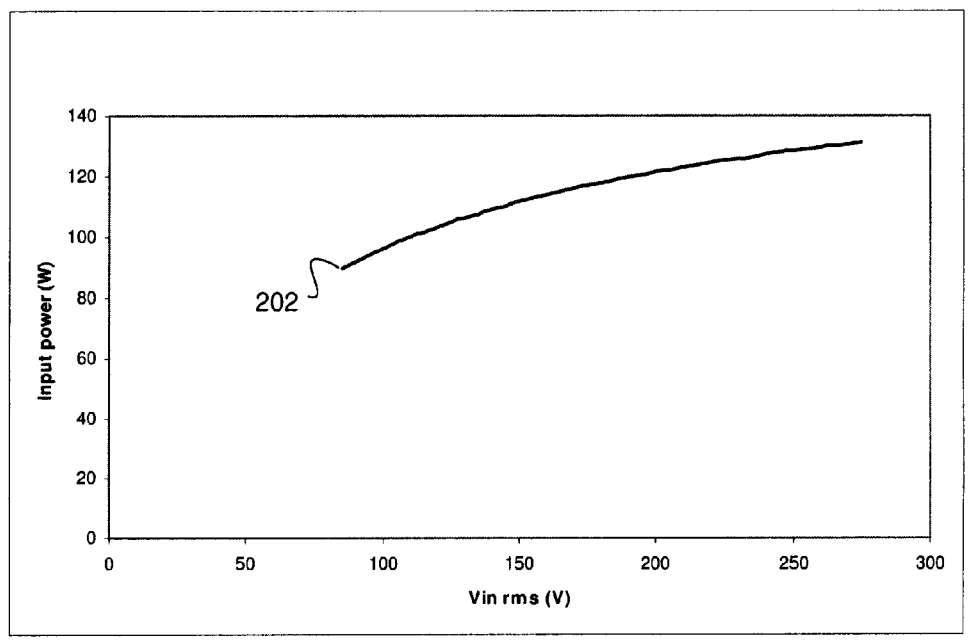
FIG. 2 shows a graph of input power vs. an input voltage $V_{in\,rms}$ for constant input current.
Figure 3:
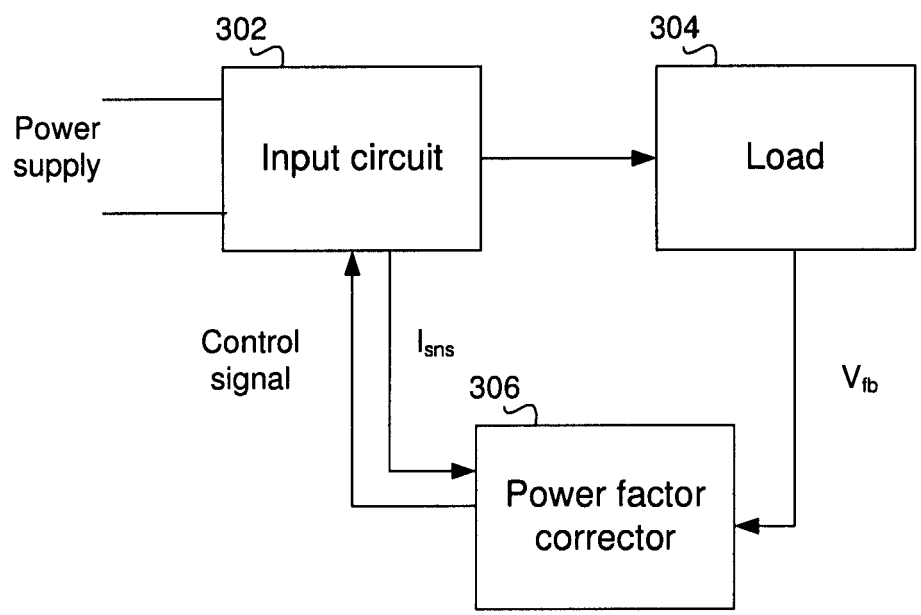
FIG. 3 depicts a simplified system for power factor correction according to one embodiment.

FIG. 3 depicts a simplified system 300 for power factor correction according to one embodiment. System 300 includes an input circuit 302, a load 304, and a power factor corrector 306. A power supply, such as a switch mode power supply, is also coupled to input circuit 302.

Power factor corrector 306 shapes an input current waveform of input circuit 302 such that it is sinusoidal and in phase with a voltage waveform of input circuit 302. In one embodiment, power factor corrector 306 receives a current $I_{sns}$ that is sensed from input circuit 302. For example, the current $I_{sns}$ may be sensed across a resistor of input circuit 302. Also, power factor corrector 306 receives an output voltage $V_{fb}$ sensed across load 304. The sensed current $I_{sns}$ and the output voltage $V_{fb}$ are used to shape the input current to be in-phase with an input voltage waveform and sinusoidal. For example, a distorted input current waveform is shaped to be sinusoidal like the voltage waveform. Also, an input current that is out of phase with the voltage waveform is shifted to be in phase with the voltage waveform. A person skilled in the art will appreciate how power factor correction is performed based on the teachings and disclosure herein.

Particular embodiments are directed to limiting a maximum current in input circuit 302 during the power factor correction. In one embodiment, power factor corrector 306 provides over-current protection (OCP). Limiting the maximum current in input circuit 302 protects system 300 from being damaged. A current limit is used to limit the maximum current. Particular embodiments adaptively change the current limit. Adaptively changing the current limit also limits variations in maximum output power limit, which further protects system 300. For example, the variation in current is reduced, which reduces the variation in power consumed.

Power factor corrector 306 uses the sensed current $I_{sns}$ to determine whether to limit the current in input circuit 302. For example, power factor corrector 306 compares the sensed current $I_{sns}$ to a generated current limit. If the current limit is exceeded, power factor corrector 306 outputs a control signal that limits the current in input circuit 302. For example, power factor corrector 306 stops a transistor from turning on for a current pulse width modulation (PWM) cycle. The PWM cycle is the cycle of a signal that turns the transistor on and off. This ensures that the current through input circuit 302 does not exceed a maximum current defined by the current limit.

Figure 4:
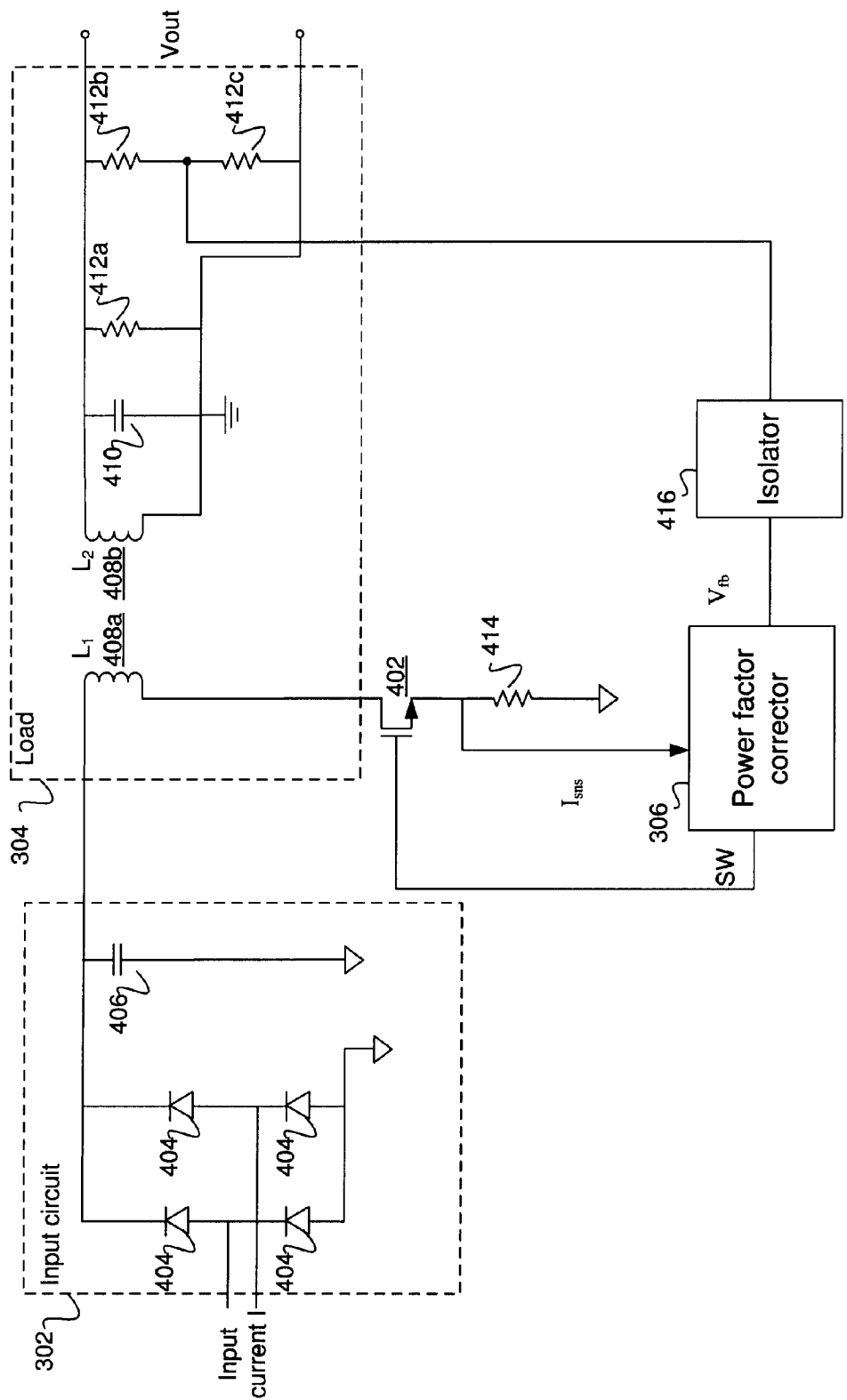
FIG. 4 depicts a more detailed example of the system according to one embodiment.

FIG. 4 depicts a more detailed example of system 300 according to one embodiment. In one embodiment, input circuit 302 includes a flyback converter. Although a flyback converter is described, power factor corrector 306 may be used in other converter topologies. The flyback converter may be used in notebook power supply adapters, such as switched mode power supplies.

Input circuit 302 includes a diode bridge 404 and a capacitor 406. Load 304 may be any load, such as a notebook computer. Load 304 includes inductors 408a and 408b, a capacitor 410, and resistors 412a, 412b, and 412c. A metal-oxide-semiconductor field-effect transistor (MOSFET) 402 and resistor 414 are also included to provide current limiting. A person of skill in the art will understand the operation of input circuit 302 and the flyback converter in accordance with the disclosure and teachings herein.

An input current I, flows through input circuit 302 and can be sensed at resistor 414. The sensed current is referred to as $I_{sns}$. Also, the output voltage $V_{fb}$ is sensed in between resistors 412b and 412c and received at power factor corrector 306 through an isolator 416. The output voltage $V_{fb}$ is used to determine amplitude of a reference current that is compared with the input current. The comparison is used to shape the input current to be sinusoidal with the input voltage waveform in power factor correction.

MOSFET 402 is controlled by power factor corrector 306 to limit current and also output power variation. For example, MOSFET 402 may be turned off if the current limit is reached in input circuit 302. Turning off MOSFET 402 stops current flowing through input circuit 302. Although MOSFET 402 is described, it will be understood that any component may be used to stop current flow in input circuit 302.

Power factor corrector 306 determines the current limit that may be adaptively, for example, changed over a half cycle of the voltage waveform. Although a half cycle is described, other portions of the cycle may be used. The adaptive current limit is compared to the sensed current $I_{sns}$ over the half cycle of the voltage waveform. In one embodiment, if sensed current $I_{sns}$ is greater than the current limit during the half cycle, MOSFET 402 is turned off using a switching signal (SW). This limits the current in system 300. Although turning MOSFET 402 off is described, it will be understood that other devices may be used in limiting current.

Figure 5A:
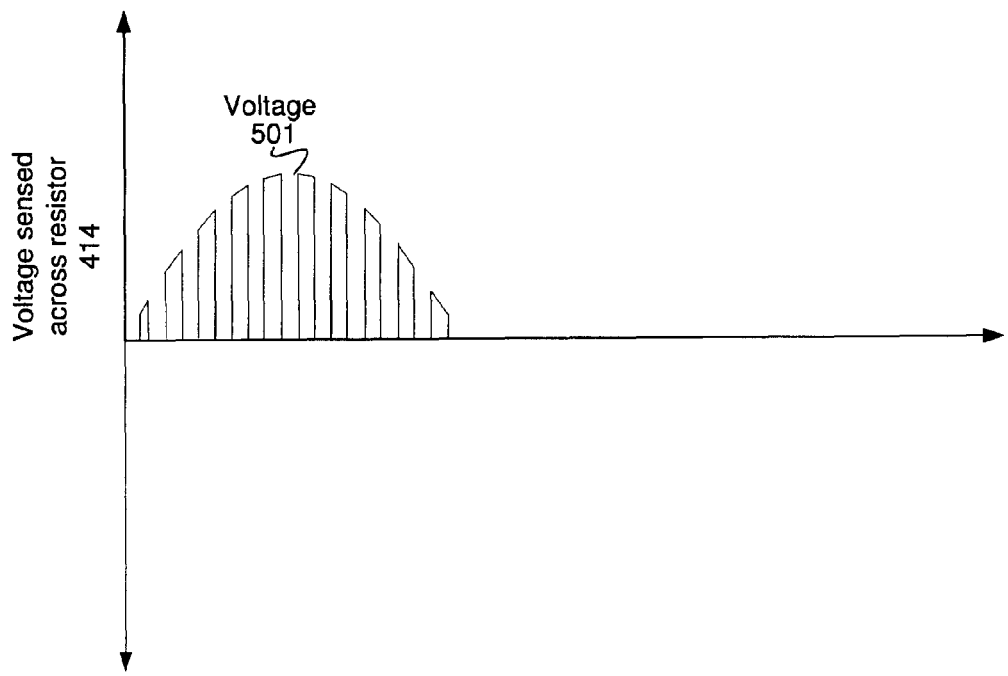
FIG. 5A depicts a graph showing the sensed voltage $V_{rsns}$ over the half cycle according to one embodiment.

In one embodiment, a current limit profile is used to dynamically change the current limit. The current limit profile may be the range of values of the current limit of the half cycle. In one embodiment, the current limit profile is sinusoidal over the half cycle of the voltage waveform. The current limit profile may be determined by calculating a peak value of the input current. A margin above the peak value of the input current is set as the peak value of a sinusoidal current limit profile. The current limit profile is generated in-phase with the input voltage The current limit profile reduces the average power limit and also the variation in the power limit over the input voltage $V_{in\ rms}$ range. An example of the current limit profile, power used, and power variation will be described for a 36W adaptor. FIG. 5A depicts a graph 500 showing the voltage across resistor 414 over the half cycle according to one embodiment. A waveform 501 shows a half cycle of the voltage across resistor 414. The current limit is adaptively changed sinusoidally based on the peak voltage calculated for each pulse of the voltage.

Figure 5C:
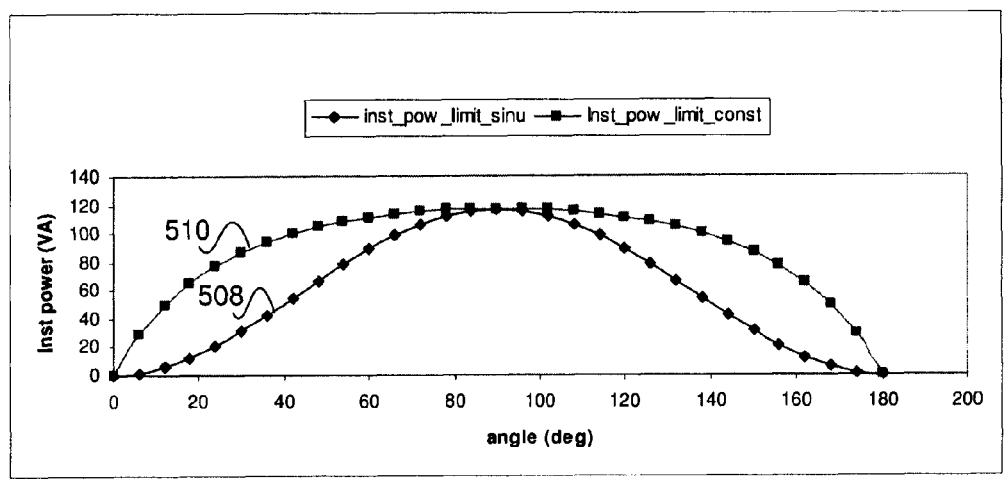
FIG. 5C depicts a graph showing the instantaneous power obtained by the sinusoidal current limit and the constant limit according to one embodiment.
Figure 5B:
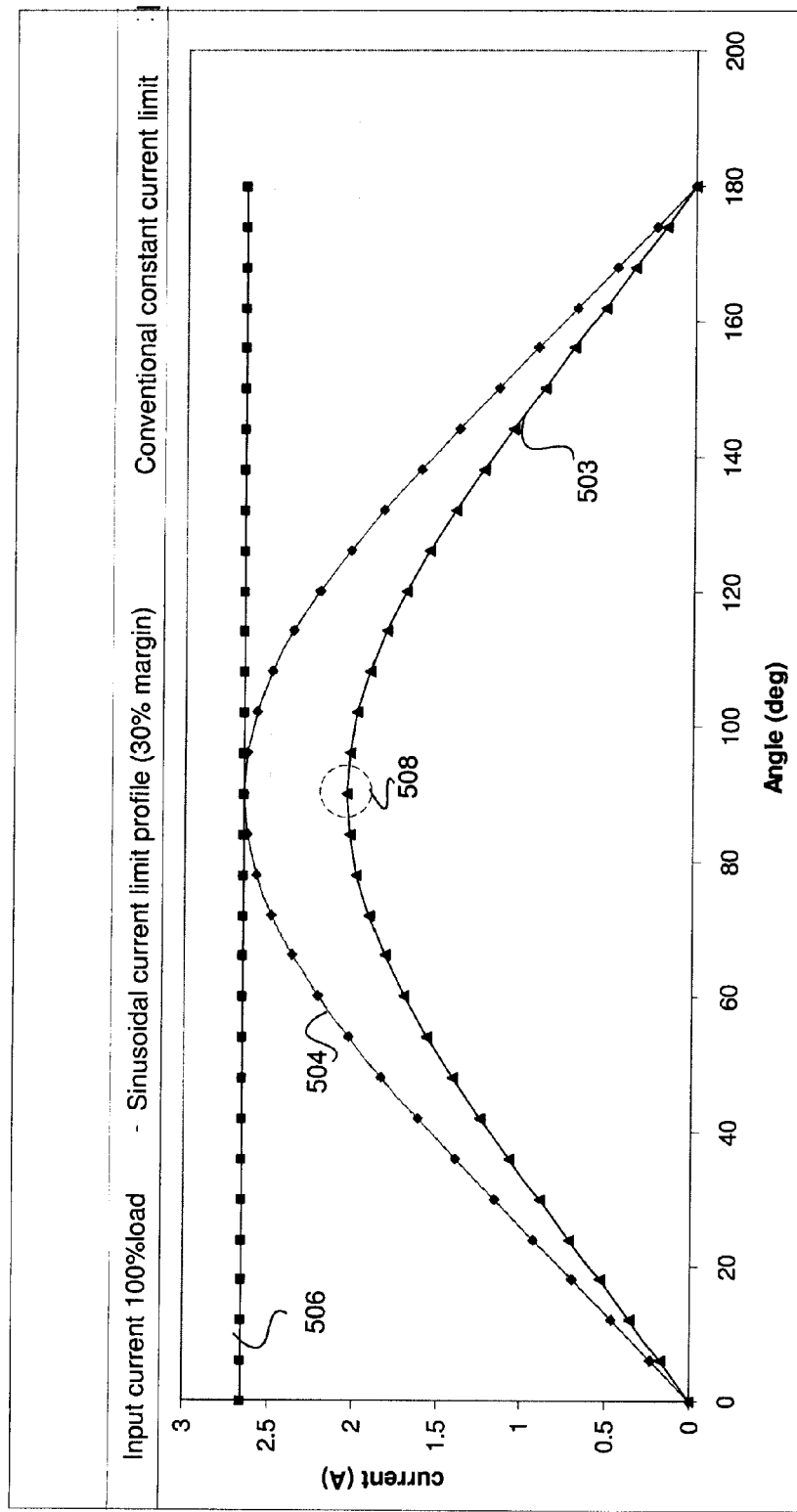
FIG. 5B depicts a graph showing the current limit profile according to one embodiment.

FIG. 5B shows a graph 502 the current limit profile according to one embodiment. A first waveform 503 shows the peak current profile at 100% load. A second waveform 504 shows a sinusoidal current limit profile $I_{pk\_limit}$ with a 30% margin. The current limit profile $I_{pk\_limit}$ shows the current limit values in the half cycle. Although a 30% margin is described, other margins may be used.

A waveform 506 shows a constant current limit that is conventionally used. For example, the conventional constant current limit takes the peak current from waveform 502 and adds a 30% margin onto the peak current found at a point 508. The conventional current limit that is determined at point 508 is kept constant throughout the half cycle as shown in waveform 506.

The power obtained using the conventional constant current limit profile and the sinusoidal current limit profile is different. FIG. 5C depicts a graph 507 showing the instantaneous power obtained by the sinusoidal current limit and the constant limit according to one embodiment. A waveform 508 shows the instantaneous power (inst_pow_limit_sinu) obtained by the sinusoidal current limit profile shown in waveform 504 of FIG. 5B. A waveform 510 shows the instantaneous power (inst_pow_limit_const) obtained by using the constant limit profile shown by waveform 506. In one example, the average power from the instantaneous power profiles is 60 watts for the sinusoidal current limit profile and 90 watts for the constant profile limit. Average power may be the area under each curve and the sinusoidal current limit profile uses less average power.

Figure 6:
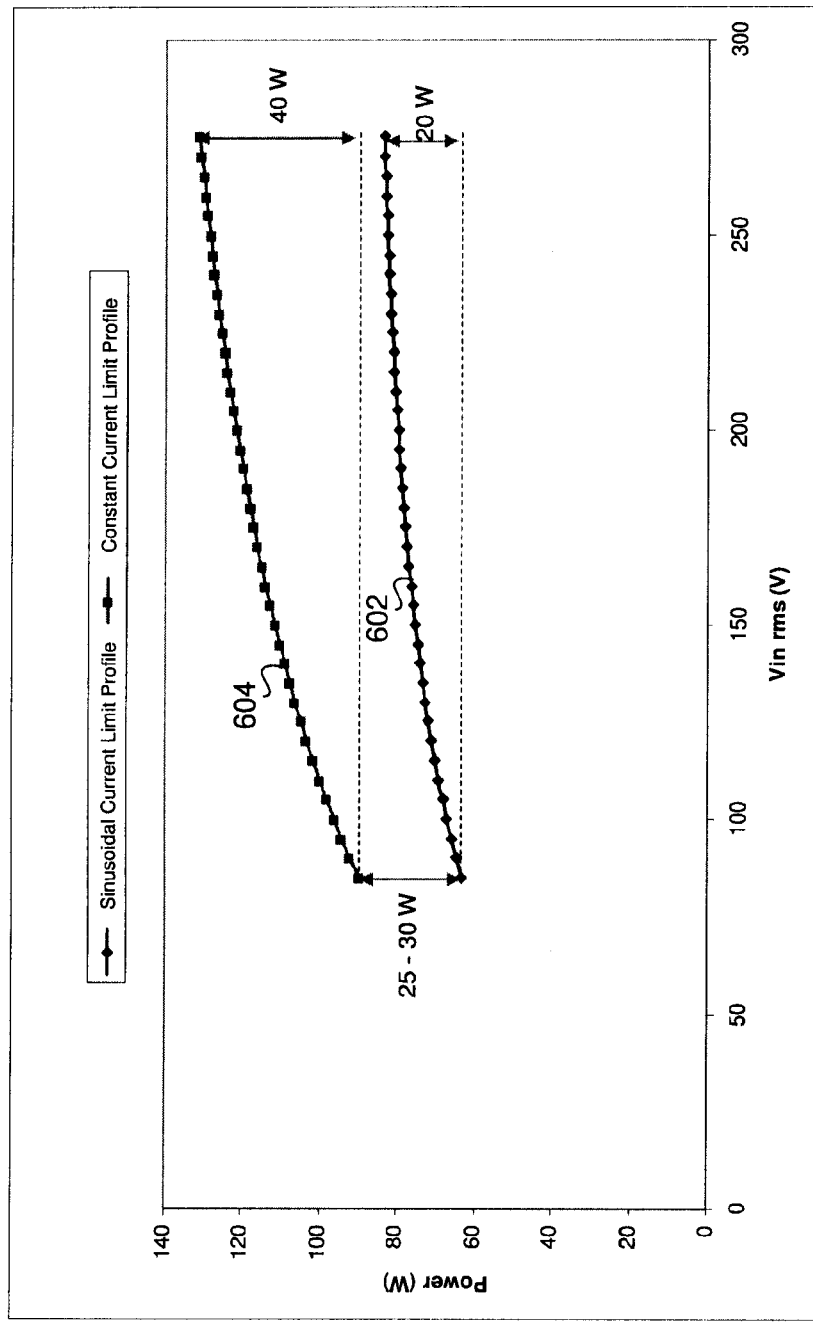
FIG. 6 depicts a graph of the change in constant and sinusoidal current limits implementations according to one embodiment.

Using the sinusoidal current limit profile also reduces the variation in power limit. FIG. 6 depicts a graph of the change in constant and sinusoidal current limits implementations according to one embodiment. A waveform 602 shows the variation in power using the sinusoidal current limit profile. As shown, a variation of 20 watts of power occurs over the range of the input voltage $V_{in\ rms}$. A waveform 604 shows the power used with the conventional constant current limit profile. As shown, the average power varies over 40 watts for the range of the input voltage $V_{in\ rms}$ for the conventional constant current limit profile.

Figure 7:
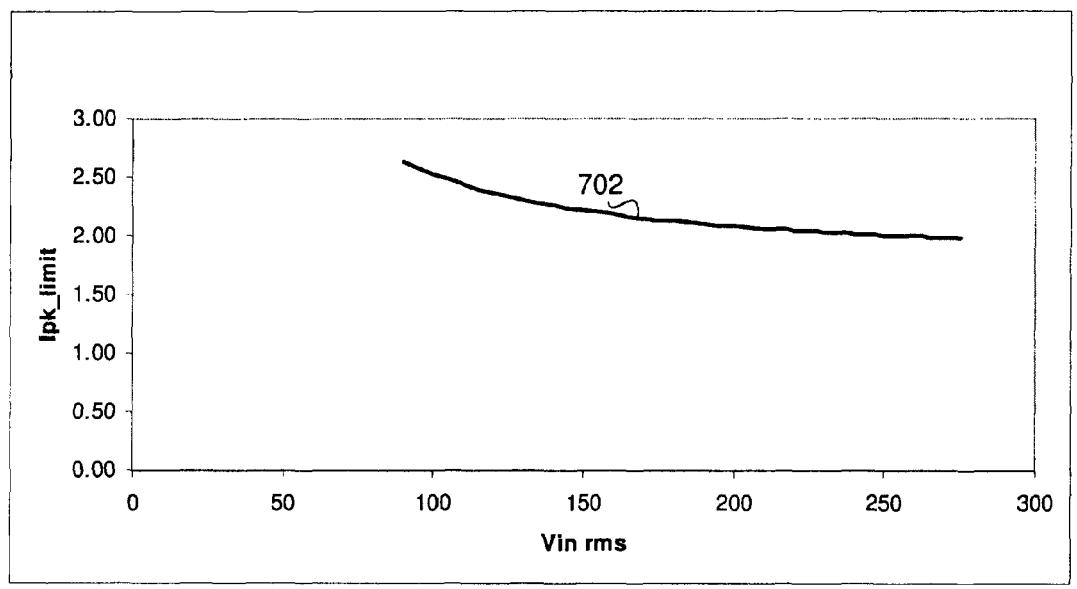
FIG. 7 depicts a graph of the relationship between a peak current limit and the input voltage $V_{in\_rms}$ according to one embodiment.

Particular embodiments use the peak current for a given rms input voltage $V_{in\ rms}$ to determine the current limit profile. In one embodiment, the current limit profile is 130% of a calculated peak current. The peak current varies with respect to the input voltage $V_{in\ rms}$. For example, if the input voltage $V_{in\ rms}$ is known, then peak current $I_{pk}$ can be determined. Then, the current limit $I_{pk\_limit}$ is determined. A relationship between $V_{in\ rms}$ and the current limit profile can thus be determined from the peak current $I_{pk}$. FIG. 7 shows a graph 700 of the relationship between the current limit and the input voltage $V_{in\ rms}$ according to one embodiment. A waveform 702 shows the values of a peak value of the current limit profile within the range of the input voltage $V_{in\ rms}$. If the value of $V_{in\ rms}$ is known, then the peak value of the current limit profile can be determined.

Figure 8:
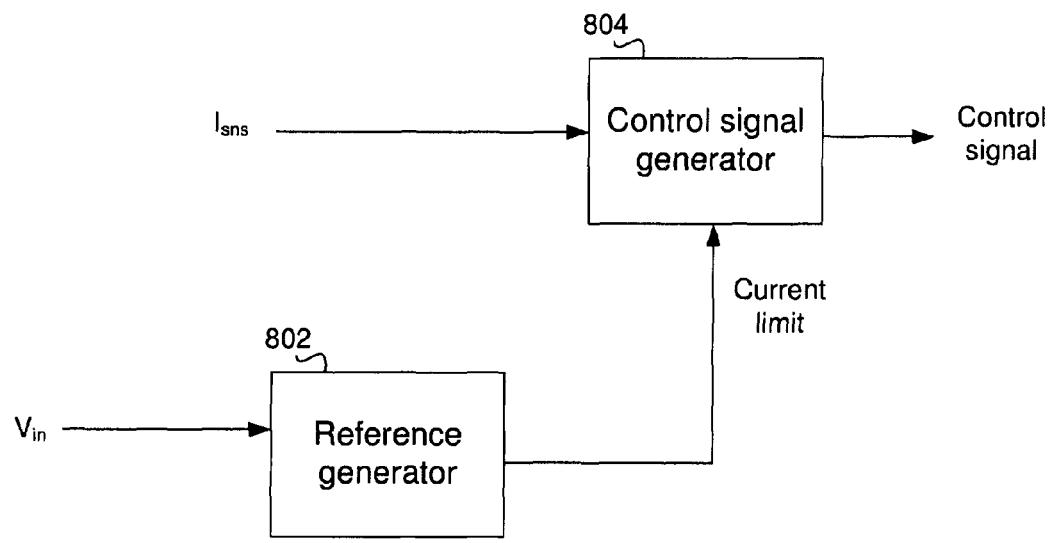
FIG. 8 depicts an example of an adaptive current limiting according to one embodiment.

The above relationship between the peak value of the current limit profile and the input voltage $V_{in\ rms}$ may be used by power factor corrector 306 to limit the current in system 300. FIG. 8 shows more detailed example of adaptive current limiting in power factor corrector 306 according to one embodiment. A reference generator 802 receives a value of the input voltage $V_{in}$. This is the input voltage at input circuit 302. Reference generator 802 can then determine a peak value of the current limit based on the input voltage. A current limit profile is then used to determine a current limit to be used in a comparison with the sensed current $I_{sns}$. This process will be described in more detail below.

A control signal generator 804 receives the current sensed $I_{sns}$ across resistor 404. Control signal generator 804 may compare the sensed current $I_{sns}$ and the current limit. Based on the comparison, the control signal may turn off MOSFET 402 to limit the current. For example, if the sensed current $I_{sns}$ exceeds the current limit, then the control signal may turn off MOSFET 402. This limits the input current. In one embodiment, the input current may be turned off for the remainder of the pulse width modulation (PWM) cycle. The PWM cycle is the signal that power factor corrector 306 outputs to MOSFET 402 to switch MOSFET 402 on and off. In this case, no more power transfer occurs across load 304. The comparison may be determined at every pulse of the sensed current.

Figure 9:
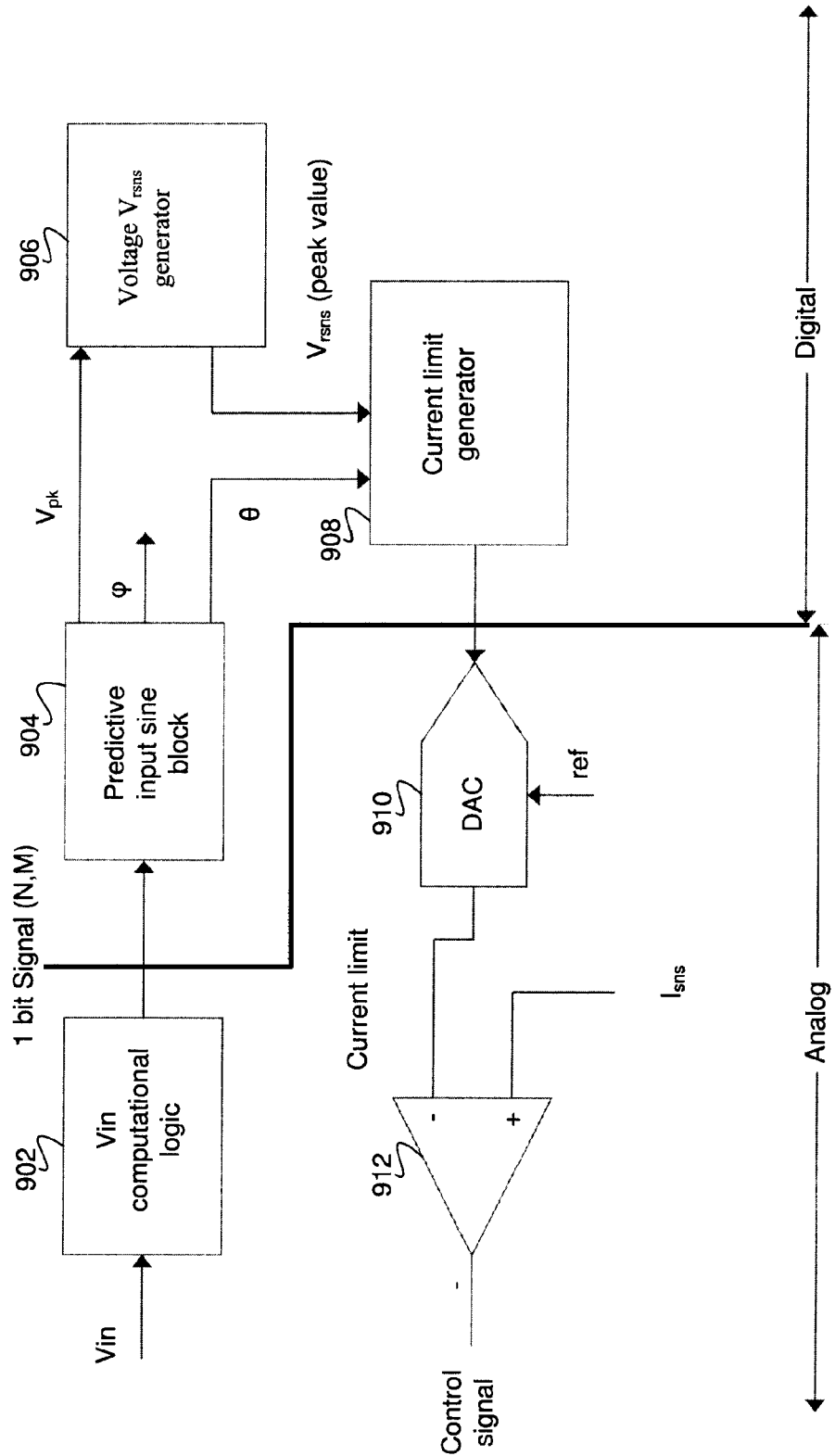
FIG. 9 depicts a more detailed example of the adaptive current limiting according to one embodiment.

The generation of the current limit sent to control signal generator 804 will now be described in more detail. FIG. 9 depicts a more detailed embodiment of adaptive current limiting in power factor corrector 306 according to one embodiment. $V_{in}$ computational logic 902 receives the input voltage $V_{in}$. A one bit signal (N, M) may be sent to a predictive input sine block 904 indicating a digital representation of the input voltage $V_{in}$. This moves from processing in the analog domain to the digital domain. Predictive input sine block 904 determines a peak value of input voltage $V_{in}$ and also an instantaneous angle θ of the input voltage $V_{in}$. The instantaneous angle θ and peak value Vpk of the pulse may be used to determine the current limit.

The peak input voltage $V_{pk}$ is sent to a voltage $V_{rsns}$ generator 906. $V_{rsns}$ may be the voltage sensed across resistor 414. The peak input voltage $V_{pk}$ is used to determine the peak value of voltage $V_{rsns}$ (peak value). A chip may process voltage values. That is, it is the voltage value that corresponds to the peak value of the current limit profile discussed above.

Figure 10:
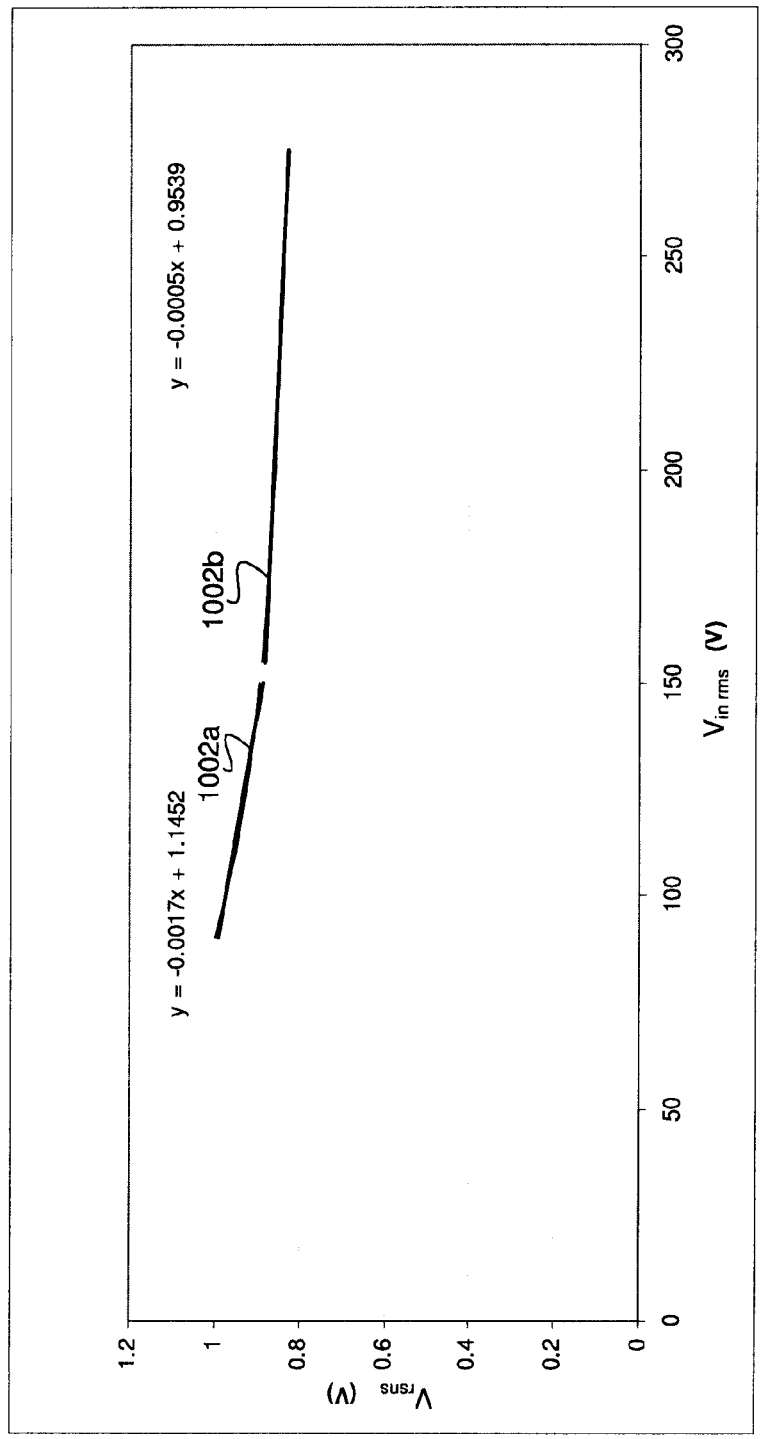
FIG. 10 depicts a graph of two piecewise linear curves that may be used to determine a peak of a sinusoidal current limit according to one embodiment.

The value of the voltage $V_{rsns}$ (peak value) may be determined in different ways. In one embodiment, a look-up table may be used. For example, a look-up table includes the values of the peak input voltage $V_{pk}$ and corresponding voltages for the voltage $V_{rsns}$ (peak value). In another embodiment, an equation may be used. For example, FIG. 10 shows a graph 1000 of two piecewise linear curves that may be used to determine the peak of a sinusoidal current limit according to one embodiment. Two piecewise linear curves 1002a and 1002b are used instead of a continuous non-linear curve because the non-linear curve may yield values that are too general. Although two piecewise linear curves are shown, it will be understood that other equations may be used to determine the voltage $V_{rsns}$ (peak value).

The two piecewise linear curves may be used to approximate the relationship of the voltage $V_{rsns}$ to the input voltage $V_{in\ rms}$. For example, the value of the voltage $V_{rsns}$ with respect to the input voltage $V_{in\ rms}$ are approximated using piecewise linear curves 1002a and 1002b. Using the equations for piecewise linear curves 1002a and 1002b, the value of the peak input voltage $V_{pk}$ may be used to determine the value of the voltage $V_{rsns}$ (peak value).

Referring back to FIG. 9, a current limit generator 908 receives the instantaneous angle θ from predictive input sine logic 904 and the value of the voltage $V_{rsns}$ (peak value) from $V_{rsns}$ generator 906. Current limit generator 908 applies the value of the voltage $V_{rsns}$ (peak value) to a sinusoidal profile to determine the current limit. For example, the angle is used to apply a sinusoidal profile to the value of the voltage $V_{rsns}$ (peak value) to determine a current limit. The equation $V_{rsns}$ (peak value)*sin(θ) may be used to determine the value of the current limit. For example, once the voltage profile from the equation is determined, it can be converted to a current profile based on a value of resistor 414, which is the current limit profile. As the voltage $V_{rsns}$ (peak value) and the instantaneous angle θ vary, the value of the current limit varies.

Current limit generator 908 determines the current limit in the digital domain. A digital-to-analog converter (DAC) 910 receives the current limit and converts it to an analog signal for a comparison.

A comparator 912 receives the current limit and the sensed current $I_{sns}$. A comparison is performed to determine if the sensed current $I_{sns}$ exceeds the current limit. Comparator 912 outputs a control signal based on the comparison. For example, the control signal may turn off MOSFET 4-402 if the current limit is exceeded by the sensed current $I_{sns}$. In one example, if the current limit is exceeded in the PWM cycle, MOSFET 4-402 is turned off immediately for the rest of the PWM cycle thereby limiting further power transfer and protecting system 3-300.

Figure 11:
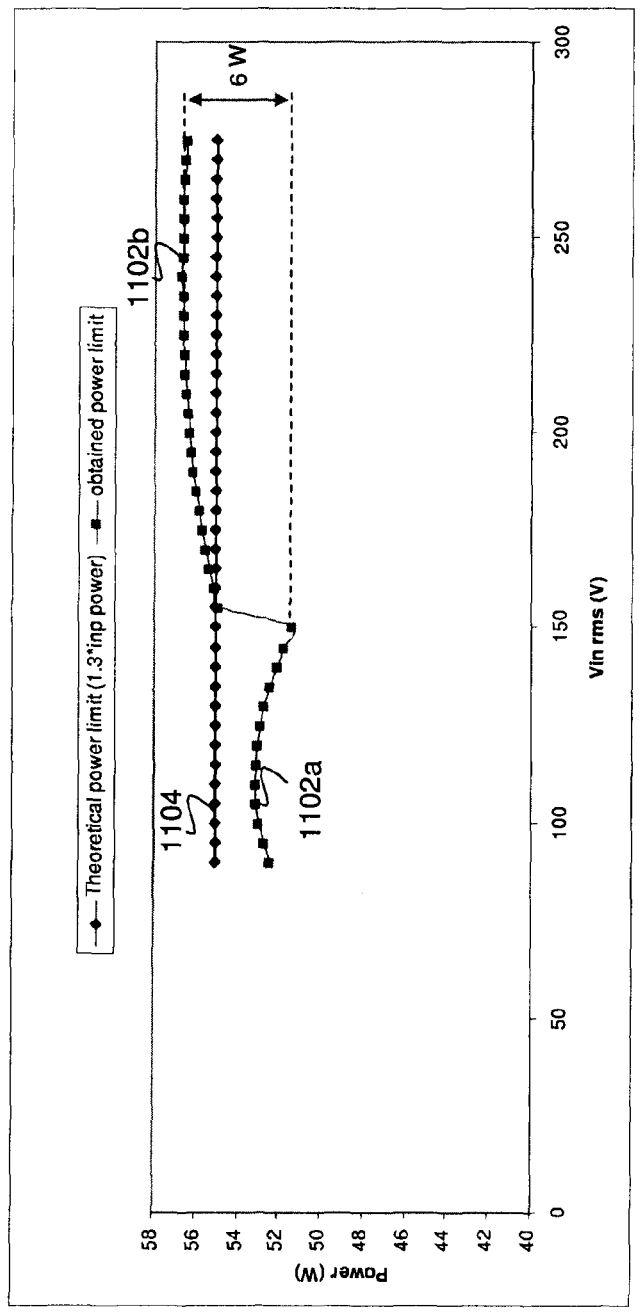
FIG. 11 depicts the variation of input power vs. the input voltage $V_{in\_rms}$ according to one embodiment.

Using the example of adaptive current limiting in power factor corrector 3-306 shown in FIG. 9 and the piecewise linear model of FIG. 10, the variation of the input power is reduced from 20 watts to 6 watts. FIG. 11 shows the variation of input power vs. the input voltage $V_{in\ rms}$ according to one embodiment. A first waveform 1102a shows the variation in power when equation 10-1002a is used to determine the voltage $V_{rsns}$ (peak value). A waveform 1102b shows the input power when the equation corresponding to equation 10-1002b is used. As shown, a variation of 6 watts occurs in the input power using piecewise linear equations 10-1002a and 10-1002b. The power variation is different in FIG. 11 as compared to FIG. 6 because the peak of the sinusoidal current limit is changed based on equations 10-1002a and 10-1002b. In FIG. 6, the current limit is constant for all Vin rms.

A waveform 1104 shows a theoretical power limit. The theoretical power limit is 130% of the input power. This is the theoretical power limit occurs when the current limit is sinusoidal and the peak value of the sinusoidal current limit is changed according to the input voltage $V_{in\ rms}$ accurately.

Figure 12:
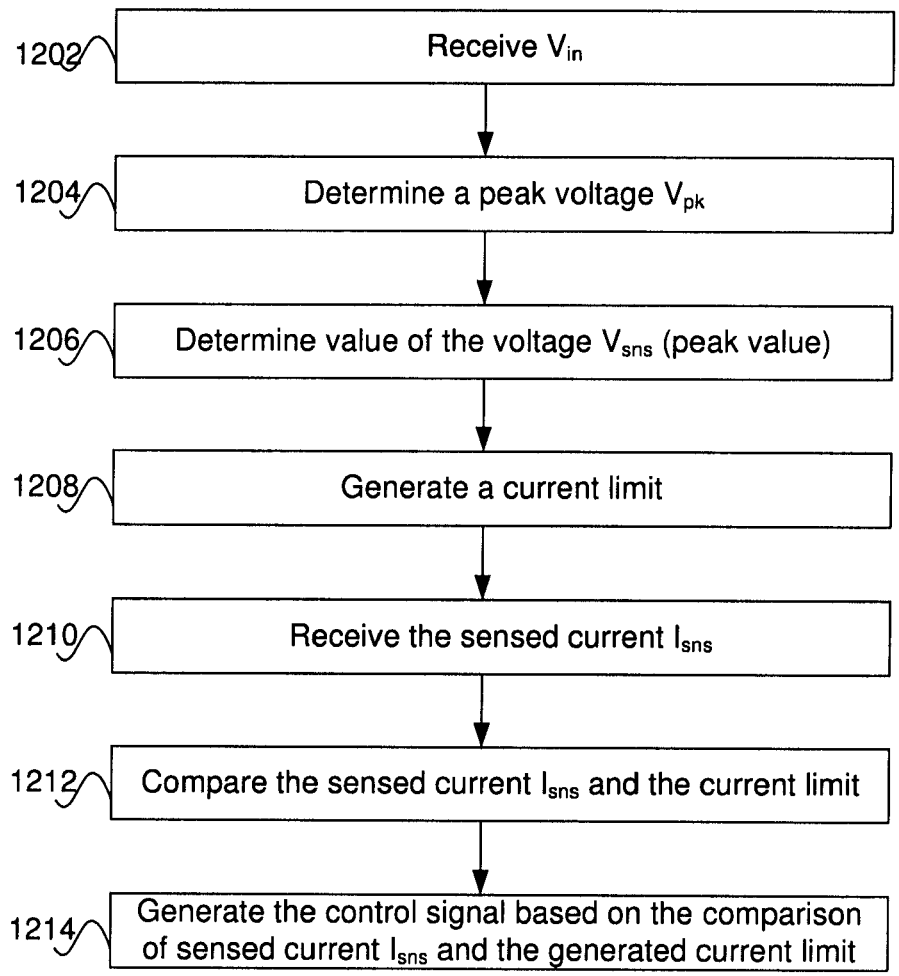
FIG. 12 depicts a simplified flowchart of a method for controlling the current according to one embodiment.

FIG. 12 depicts a simplified flowchart 1200 of a method for controlling the current according to one embodiment. At 1202, the input voltage $V_{in\ rms}$ is received. At 1204, a peak input voltage $V_{pk}$ is determined.

At 1206, the value of the voltage $V_{sns}$ (peak value) is determined. At 1208, a current limit is generated by applying a sinusoidal profile to the value of the voltage $V_{sns}$, (peak value). In one embodiment, the current limit may be converted from a digital to analog value.

At 1210, the sensed current $I_{sns}$ is received. At 1212, a comparison of the sensed current $I_{sns}$ and the current limit may then be performed. At 1214, the control signal is generated based on the comparison of sensed current $I_{sns}$ and the generated current limit. The above method is performed over the half cycle of the input voltage.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents may be employed without departing from the scope of the invention as defined by the claims.

What is claimed is:

1. A system, comprising:
   an input circuit configured to i) receive a current provided from a power supply, and ii) provide, based on the current from the power supply, an output voltage to a load; and
   a power factor corrector configured to
      sense i) a feedback current associated with the input circuit, and ii) a feedback voltage associated with the output voltage to the load,
      determine a peak value of an input voltage associated with the input circuit,
      generate, using the peak value of the input voltage, a current limit profile, wherein the current limit profile defines a range of values of a current limit over a half cycle of the input voltage,
      compare the feedback current to a current limit in the current limit profile, and
      based on i) the output voltage to the load, and ii) the comparison of the feedback current to the current limit, shape the current provided from the power supply, wherein
         the power factor corrector is configured to adjust the current limit based on the current limit profile, and
         the current limit profile is based on a margin above the peak value of the current provided from the power supply.

2. The system of claim 1, wherein the power factor corrector is configured to shape the current provided by the power supply to be in phase with the input voltage.

3. The system of claim 1, wherein the power factor corrector is configured to shape the current provided by the power supply so as to prevent the current provided by the power supply from exceeding the current limit.

4. The system of claim 1, wherein the power factor corrector is configured to i) generate a reference current based on the feedback voltage, and ii) shape the current provided by the power supply further based in part on a comparison between the reference current and the feedback current.

5. The system of claim 1, wherein the current limit profile is sinusoidal.

6. A method, comprising:
   receiving a current provided from a power supply;
   providing, based on the current provided from the power supply, an output voltage to a load;
   sensing a feedback current associated with the current provided from the power supply;
   sensing a feedback voltage associated with the output voltage to the load;
   determining a peak value of an input voltage associated with the current provided from the power supply;
   generating, using the peak value of the input voltage, a current limit profile, wherein the current limit profile defines a range of values of a current limit over a half cycle of the input voltage,
   performing a comparison of the feedback current to a current limit in the current limit profile;

based on i) the output voltage to the load and ii) the comparison of the feedback current to the current limit, shaping the current provided from the power supply;

and adjusting the current limit based on the current limit profile, wherein the current limit profile is based on a margin above the peak value of the current provided from the power supply.

7. The method of claim 6, wherein shaping the current provided from the power supply includes shaping the current provided from the power supply to be in phase with the input voltage.

8. The method of claim 6, wherein shaping the current provided from the power supply includes preventing the current provided from the power supply from exceeding the current limit.

9. The method of claim 6, further comprising:
generating a reference current based on the feedback voltage,
wherein shaping the current provided from the power supply comprises shaping the current provided from the power supply further based in part on a comparison between the reference current and the feedback current.

10. The method of claim 6, wherein the current limit profile is sinusoidal.

* * * * *